United States Patent [19]

Larsson et al.

[11] Patent Number: 5,080,269

[45] Date of Patent: Jan. 14, 1992

[54] FIXATION DEVICE

[75] Inventors: Göran Larsson, Gothenburg; Ake Bergqvist, Västra Frölunda, both of Sweden

[73] Assignee: AB Volvo, Sweden

[21] Appl. No.: 575,191

[22] Filed: Aug. 29, 1990

[30] Foreign Application Priority Data

Aug. 31, 1989 [CH] Switzerland ............... 8902882

[51] Int. Cl.⁵ .................................. B62D 43/00
[52] U.S. Cl. ........................ 224/42.24; 224/42.12
[58] Field of Search ............ 224/42.24, 42.12; 296/37.2, 37.14

[56] References Cited

U.S. PATENT DOCUMENTS

| | | | |
|---|---|---|---|
| 3,843,033 | 10/1974 | Wirth, Sr. | 224/42.24 |
| 4,015,761 | 4/1977 | Kokko | 224/42.24 |
| 4,111,344 | 9/1978 | MacDonald | 224/42.24 |
| 4,130,227 | 12/1978 | Rice | 224/42.24 |
| 4,404,151 | 9/1983 | Inkpen et al. | |
| 4,423,900 | 1/1984 | Sugimoto et al. | |
| 4,738,382 | 4/1988 | Natore | 224/42.24 |

FOREIGN PATENT DOCUMENTS

A546263 11/1922 France.
A2094263 2/1972 France.
58-81869 5/1983 Japan.

Primary Examiner—Linda J. Sholl
Attorney, Agent, or Firm—Lerner, David, Littenberg, Krumholz & Mentlik

[57] ABSTRACT

Fixation device for releasably fastening an object provided with a through-hole. The device consists of a screw part 1, an attachment part 2 for attaching the screw part to a surface to which the object is intended to be fixed, and a nut part 3. The latter is screwed on the screw part and locates the object in a fastening position via contact with a portion of the object and in a releasing position permits the removal of the object from the fastened position. The attachment part 2 and the screw part 1 are releasably coupled together by means of a coupling arrangement 6,7 with two coupling parts which together form a bayonet fastening. The first coupling part 6 is arranged on one end of the screw part 1 and the other coupling part 7 is arranged in the attachment part 2. The nut part 3 and the screw part 1 operate the bayonet fastening between the coupled position and the released position by rotation of the nut part.

10 Claims, 4 Drawing Sheets

FIXATION DEVICE

BACKGROUND OF THE INVENTION

The present invention relates to a fixation device for releasably fastening an object provided with a through-hole, and more specifically to a fixation device for fastening a spare wheel to a vehicle.

It is known from, for example, U.S. Pat. No. 4 423 900 to use a fixation device which comprises three distinct parts, namely a screw part, a nut part and an attachment part for fixing a spare wheel to a vehicle. The screw part is screwed into the attachment part and, in order to release the spare wheel, either the screw part or the nut part must be turned through a number of revolutions so that the screw part or the nut part is screwed from its threaded engagement with its respective part. On the other hand, it is necessary that the screw part or the nut part must be threaded into the attachment part or onto the screw part respectively. This requires great accuracy and is often problematic in poor light conditions, leading to the risk of damaging the screw threads and therefore consequent mounting problems. The threaded connection between the screw part and the attachment part certainly gives a very tight connection, but can lead to the risk of deformation of the screw part, again with consequent mounting problems. Alternatively, the base of the screw part can be welded to the attachment part or directly to the vehicle. Here, though, there exists the risk of fissures developing at the attachment location resulting from the transverse forces which arise from the unavoidable movement of the spare wheel.

Another type of spare wheel mounting is described in JP 58-81869. Instead of having a threaded attachment part as in the above-mentioned US document, the attachment part of the JP arrangement is provided with a slot into which protrusions on a corresponding screw part fit. The attachment part is mounted behind the surface to which the spare-wheel is to be fastened and so a similar slot is also required in this surface. A nut part is provided on the end of the screw part remote from said protrusions and acts on a forcible connector to tighten said connector to the spare wheel. This slot and protrusion arrangement overcomes the necessity of trying to thread the attachment, screw and nut parts together. However, such an arrangement is prohibitively expensive due not only to the number of parts required, but also to the need to provide a slot in the fastening surface. Since a slot has to be provided, the risk of corrosion is introduced.

The object of the present invention is to eliminate the above-mentioned problems and to provide a fixation device which, in a quick and safe way, permits a releasable fixation of an object.

BRIEF STATEMENT OF THE INVENTION

The object of the invention is achieved with a fixation device having three distinct parts, namely a screw part, an attachment part and a nut part. The screw part and the attachment part are provided with cooperating coupling parts which form a releasable bayonet fastening therebetween.

BRIEF DESCRIPTION OF THE DRAWINGS

The invention will be described in more detail in the following by way of an example with reference to the attached drawings, in which.

DETAILED DESCRIPTION OF THE INVENTION

Figure 1:
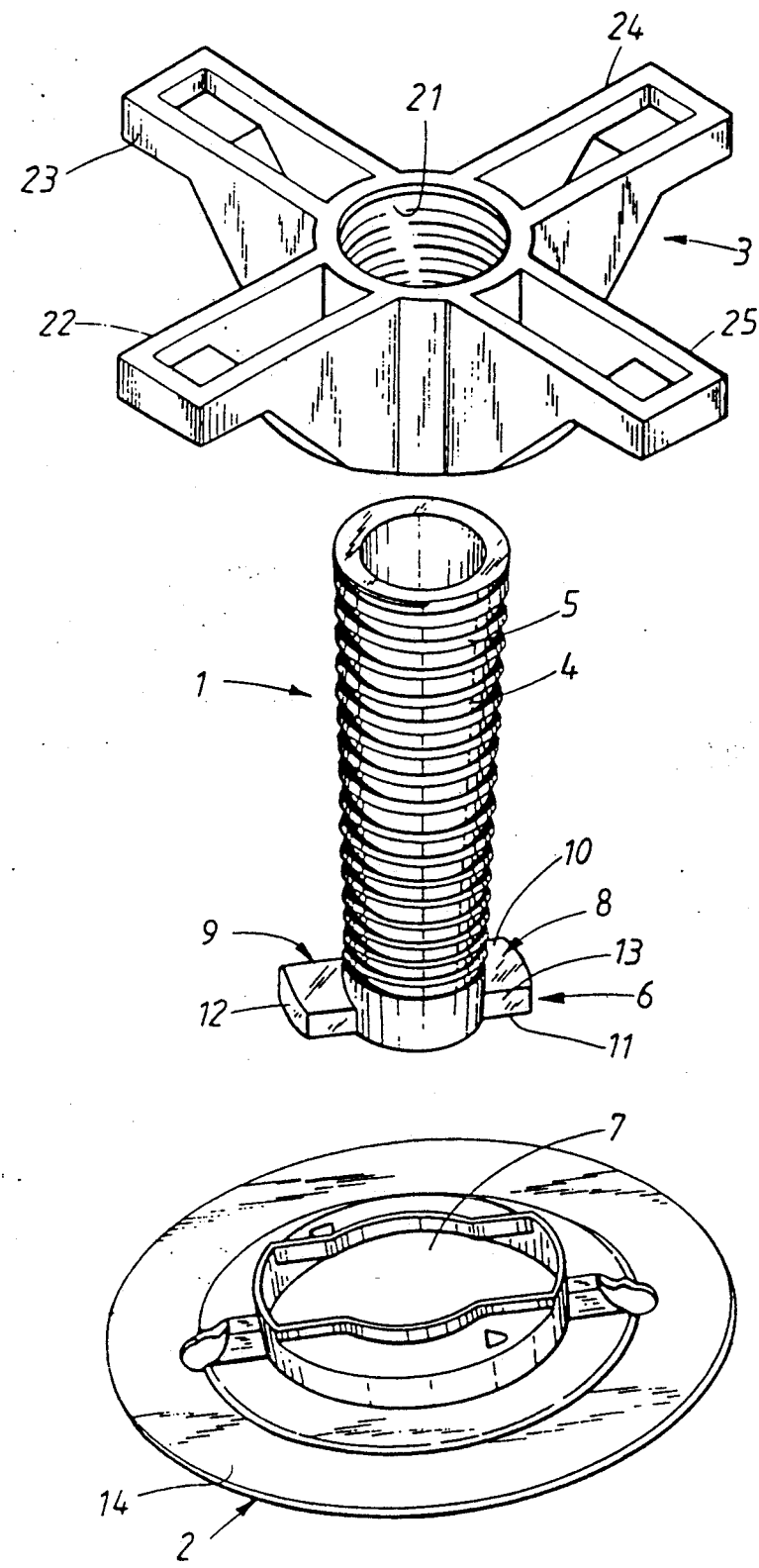
FIG. 1 shows an exploded view of the various parts of the fixation device.

As can best be seen from the exploded view in FIG. 1, the fixation device according to the invention comprises three parts, namely, a screw part 1, an attachment part 2 to which the screw part is releasably fixable, and a nut part 3 which is releasably fixable to the screw part. The screw part 1 consists of a rod 5 provided with threads 4 which at one end is provided with a coupling portion 6 intended for connection with a coupling portion 7 arranged in the attachment part 2. Both these coupling portions 6, 7 form a coupling arrangement for releasably connecting the screw part 1 with the attachment part 2. The coupling arrangement 6, 7 is of the bayonet type for quick and simple connection and disconnection of the two parts. The coupling portion 6 on the screw part 1 in the shown example constitutes the male part of the bayonet fastening and is formed with two flanges 8, 9 projecting radially from one end of the rod 5 which are diametrically opposed to each other. The flanges 8, 9 each exhibit two opposed support surfaces 10, 11 which extend in a substanially radial plane, a convex guide surface 12 which suitably has the shape of a portion of a cylindrical surface, and two opposed side surfaces 13 of which one forms an abutment surface to limit the screw's rotation during its connection to the attachment piece 2 through contact in a way which is described below in more detail.

Figure 3:
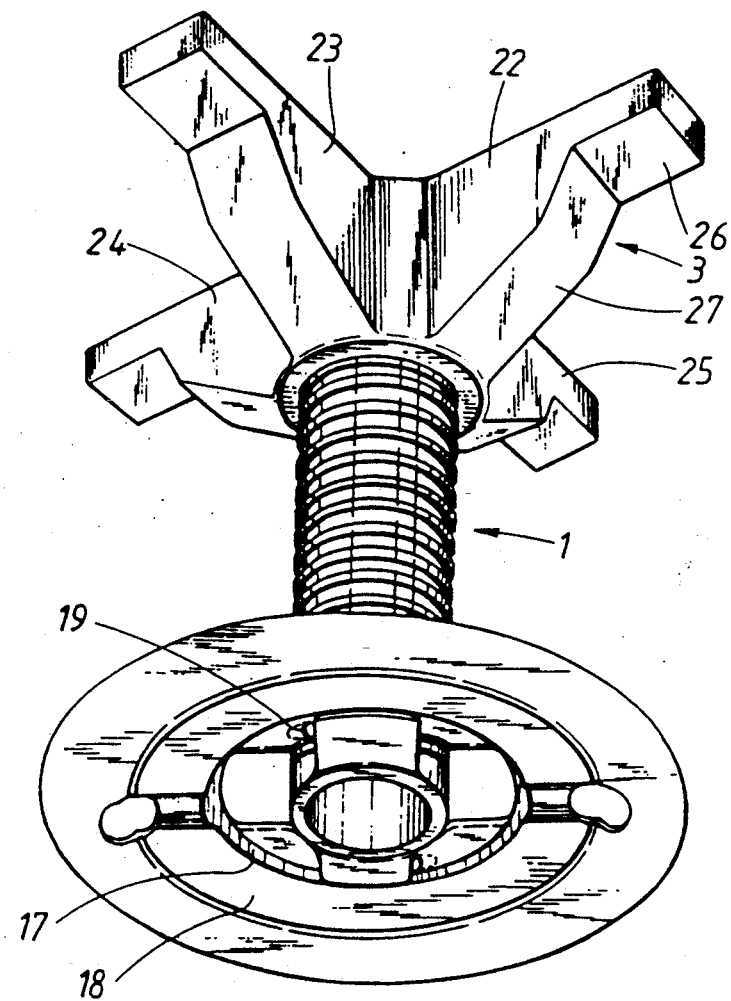

The attachment piece 2 exhibits a mounting plate 14 with which the attachment part is intended to be fixed to, for example, the surface against which an object is to be held, for example, the body of a vehicle. The attachment can, by way of example, be made by spot-welding the plate 14 to the surface in question. The mounting plate 14 surrounds the coupling portion 7 in the coupling arrangement which forms the female part of the bayonet fastening. Coupling portion 7 has a substanially cylindrical cavity 15 with a turned-up opening 16 having a shape which corresponds to the end of the screw part 1, i.e. the total outline shape which is formed by the rod's 5 circular end and the two flanges 8, 9. The cavity 15 is delimited by a cylindrical surface-shaped, inwardly facing guide surface 15 and a substantially flat support surface 18 (see FIG. 3) as well as a region of the surface to which the attachment part is fixed in the mounted state. This region is suitably level and situated at a distance from the support surface 18 which substantially corresponds to the height of the flanges 8, 9. Furthermore, at least one, or two, diametrically opposed stop pieces 19 project from the support surface 18, which, via cooperation with the abutment surfaces of the flanges 8, 9, delimit the final position of rotational movement of the screw 1 during its connection to the attachment part 2. The attachment part 2 further presents an upward, circumferential stiffening web 20 around the opening 16.

The nut part 3 exhibits a cylindrical through hole 21 with internal threads designed to be brought into threaded engagement with the external thread 4 of the screw part 1 so that the nut part can, through turning, be moved along the screw part. The nut part further exhibits four arms 22, 23, 24, 25 intended to be manually gripped to facilitate the turning of the nut.

Figure 4:
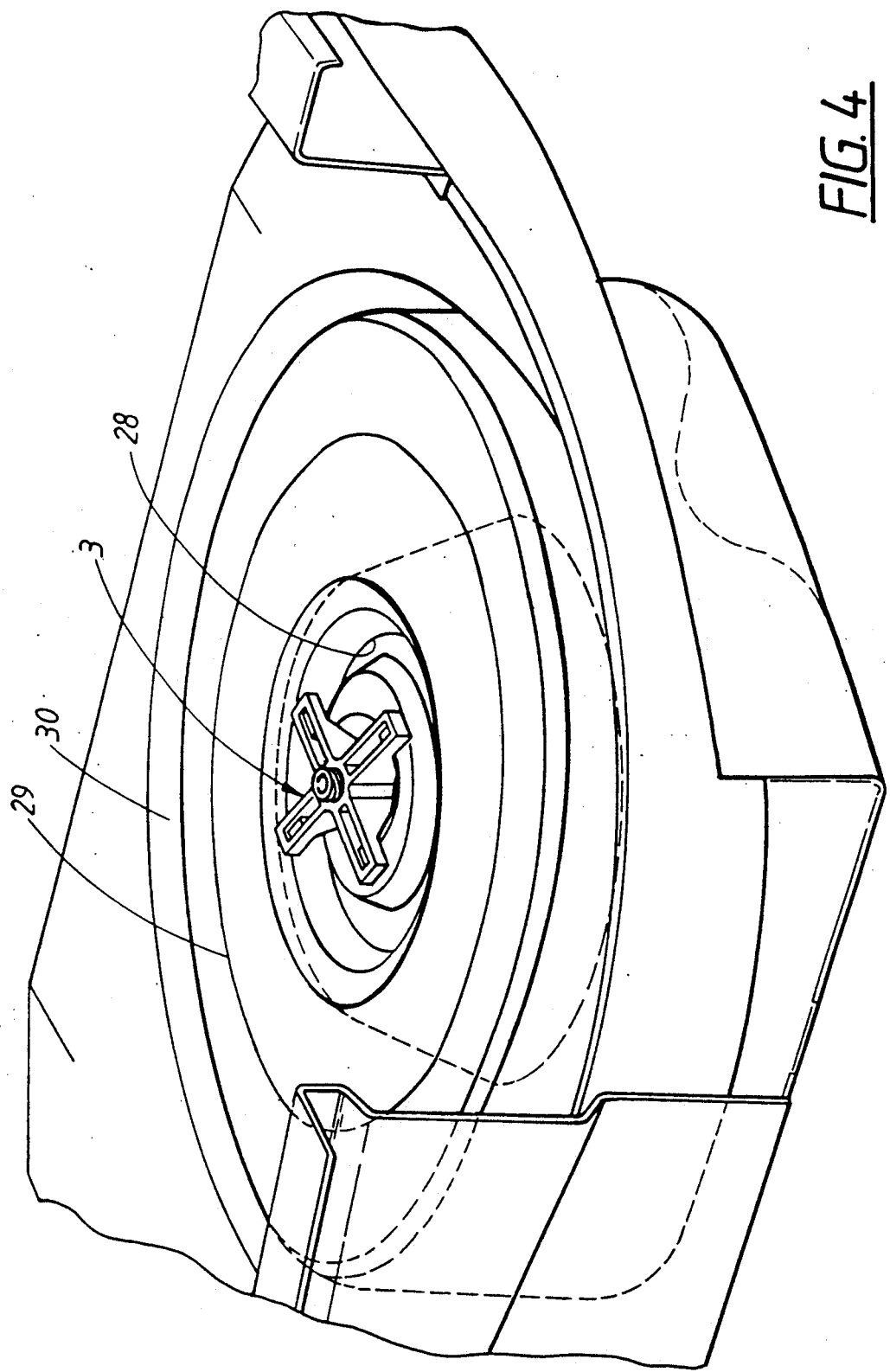
FIG. 4 shows a perspective view of the fixation device and the object which is to be fastened in the fixed position.

On the side facing the attachment part 2 the arms 22–25 have abutment surfaces 26, 27 for contact against some portion of the object around a hole 28 (see FIG. 4) through which the fixation device is intended to pass in the mounted state. One of the abutment surfaces 27 of each arm converges towards the screw part's longitudinal axis in the direction towards the screw part's bayonet portion and, together with the corresponding converging surfaces of the other arms, can be shaped as a cone's frostrum. Via contact with the edge portion of the normally circular centre hole 28 of the object 29 which is to be located, which in the shown example is a vehicle's spare wheel, the converging surfaces are intended to form centering guides for the centre hole. In this way the object is effectively located against sideways displacement, in addition to axial movement, i.e. in the longitudinal direction of the screw part 1. With larger holes, where the opening edge is outside of the converging abutment surfaces 27, the abutment surfaces 26 which extend substanially in a radial plane instead serve to exert pressure on the object in the axial direction of the screw part 1.

The operation of the fixation device according to the invention during attachment for example of a spare wheel 29 and its release occurs as follows The spare wheel 29 is placed in its so called well 30 which usually comprises a depression in the boot of a vehicle. The well is somewhat overdimensioned in relation to the size of the spare wheel in order to facilitate the placement and removal of the spare wheel. The attachment part 2 is rigidly fixed in the centre of the well, with the mounting plate 14 attached to the bottom of the well which thereby also forms the base for the coupling portion of the mounting part. During normal use, the nut part 3 is always partially screwed on the screw part's 1 end which is remote from the end which is provided with the bayonet mounting 6. The assembly of the nut part 3 screwed on the end of the screw part 1 is used such that the screw part's arms 22–25 are gripped with one hand and lowered, with the screw part 1 in the centre hole 28 of the spare wheel 29 with the spare wheel in its well. Between the arms is a view-space down into the hole so that the screw part's 1 end with the bayonet mounting 6 can be easily introduced through the opening 16 in the bayonet mounting 7 of the attachment part 2. This movement is abutted by the bottom of the well which assures that the screw part 1 is maintained more or less perpendicular to the attachment part 2, after which the nut part 3, and with it the screw part 1, is turned in the direction for tightening the nut part, i.e. clockwise. Because of the friction between the threads of the screw part and nut part, the screw part is brought to move, resulting in the screw part's bayonet mounting, i.e. both flanges 8, 9, turning in the bayonet mounting 7 in the attachment part 2, i.e. beneath the support surface 18 of the cavity 15 until the flanges with their respective abutment surfaces 13 come into contact with the stop piece 19 in the bayonet mounting of the attachment part. The turning movement of the screw part hereby accordingly stops, whereafter the friction in the screw threads is overcome and continued turning of the nut part 3 screws it downwardly along the screw part until the nut part's abutment surfaces 26 or 27 come into contact with the portion around the spare wheel's centre hole 28. It is hereby ensured that the coupling arrangement which is formed by the bayonet fastening securely holds the screw part and the attachment part together due principally to the co-operation between the abutment surfaces 10 on the flanges 8, 9 and the abutment surface 18 in the attachment part 2. The above-mentioned cylindrical surface-shaped guide surfaces 12, 17 on the screw part 1 and the attachment part 2 respectively, principally act as guides during coupling together, i.e. during introduction of the flanges in the opening 16 and during turning of the flanges in the cavity 15.

The fixation device is released in a corresponding way, but in the reverse direction. The nut part 3 is turned by hand in the anti-clockwise direction. At the start of this rotation, the friction between the coupling parts in the bayonet fastening overcomes the friction in the threads between the screw part and the nut part and therefore the nut part at the start is normally screwed up somewhat relative to the screw part, but the screw part is relatively quickly brought into the turning motion of the nut part and the flanges 8, 9 are turned from their abutment position to the opening 16, whereafter the nut part and the screw part can be lifted out and the fixation device thus releases the spare wheel so that it can be taken out.

With the fixation device according to the invention, the friction in the threads is so adapted that the nut part easily brings the screw part to its turning movement, so that the nut part does not need to be screwed entirely from the screw part. Furthermore, the bayonet joint does not give a totally rigid coupling between the screw part and the attachment part, but allows certain slight flexibility between these two parts so that undesired stresses do not occur in the included parts, even if relatively large tolerances exist. Additionally, the fixation device can, in the main, be manufactured from a non-corrodable material, such as plastic. Thus, the nut part and the screw part can be made from a plastic material whilst the attachment part can, advantageously, be made from sheet metal, i.e. the material which forms the surface to which the attachment part is fixed. Since the attachment part is plate-shaped and mounted directly to the surface against which the object (in this case a spare-wheel) is to be held, no expensive hole-forming is required in this surface. Similarly the risk of corrosion is eliminated.

Figure 2:
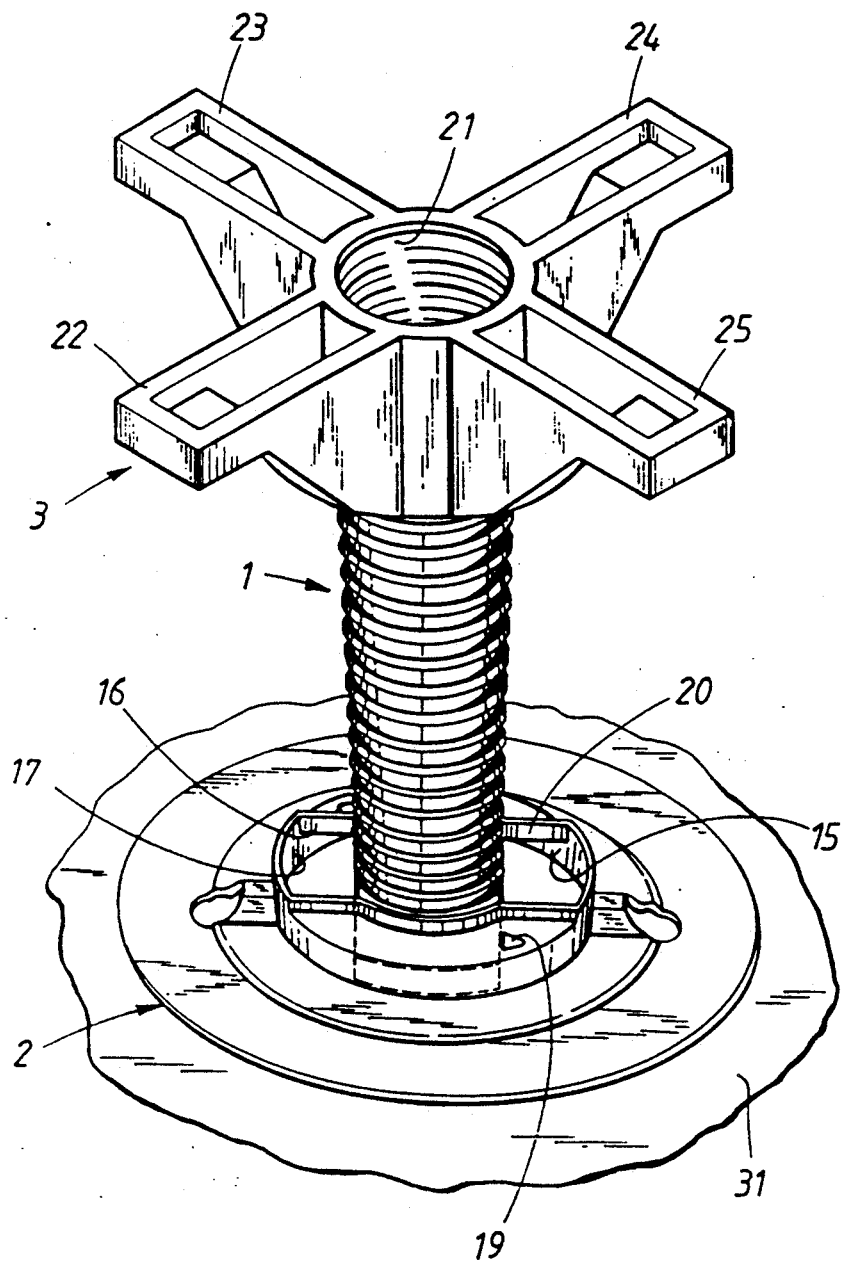
FIGS. 2 and 3 show in perspective views the fixation device with the parts assembled.

The invention is not restricted to the above described embodiments or those shown in the drawings, but can be varied within the scope of the following patent claims. By way of example, it is of course imaginable that the nut part is totally reversed so that the upper side, as shown in FIG. 2, is instead directed towards the object which is to be fastened. Furthermore, the coupling arrangement can have another form. Accordingly, the attachment part can be provided with the male part of the bayonet fastening whilst the screw part presents the female part.

What is claimed is:

1. A fixation device for releasably fastening an object having an opening to a surface, said fixation device comprising substantially flat attachment means including a lower surface and an upper surface, said lower surface including a planar surface portion adapted to be rigidly affixed to said surface and said upper surface including a first coupling portion having a predetermined height, screw means having a first end and a second end and a threaded portion extending from said second end, said first end of said screw means including a second coupling portion adapted for releasable coupling to said first coupling portion of said attachment means by rotation between a released position and a coupled position, said second coupling portion of said screw means having a height substantially corresponding to and less than said predetermined height, whereby said second coupling portion is in proximity to said surface when releasably coupled to said first coupling portion of said attachment means, and nut means including a threaded portion, whereby said threaded portion of said nut means may be screwed onto said threaded portion of said screw means at said second end of said screw means, said nut means including a contact portion adapted for releasable engagement with said object, whereby upon engagement of said first coupling portion of said attachment means with said second coupling portion of said screw mean sin said released position and threaded engagement of said nut means at said second end of said screw means, said screw means may be rotated into said coupled position and said contact portion of said nut means can engage said object so as to releasably fasten said object to said surface.

2. The fixation device of claim 7 wherein said nut means includes a plurality of radially extending arms to assist in rotation of said nut means so as to threadably engage said nut means with said screw means.

3. The fixation device of claim 2 wherein said plurality of radially extending arms comprising four radially extending arms.

4. The fixation device of claim 2 wherein said contact portion of said nut means includes a plurality of substantially planar portions associated with each of said plurality of arms for engagement with said object.

5. The fixation device of claim 4 wherein said nut means includes a plurality of angled surface portions angularly disposed between said corresponding plurality of substantially planar surfaces and said threaded portion of said nut means.

6. The fixation device of claim 5 wherein said plurality of angled surface portions of said nut means extends both radially and longitudinally so as to extend towards said first end of said screw means when said nut means is threadably engaged with said second end of said screw means whereby said fixation device can be centered in said opening as said nut means is threadably engaged upon said screw means.

7. The fixation device of claim 7 wherein said second coupling portion of said screw means comprises a pair of oppositely directed radial flange portions, and wherein said first coupling portion of said attachment means comprises an opening in said attachment means for accepting said first end of said screw means including said pair of oppositely directed radial flange portions.

8. The fixation device of claim 7 wherein said attachment means includes stop means associated with said second coupling portion whereby upon rotation of said first end of said screw means including said second coupling portion from said release position to said coupled position, said pair of oppositely directed radial flanges abut against said stop means so as to maintain said second coupling member in said coupled position.

9. The fixation device of claim 7 wherein said screw means and said nut means comprise a non-corrodible material.

10. The fixation device of claim 9 wherein said non-corrodible material comprises plastic.

* * * * *

UNITED STATES PATENT AND TRADEMARK OFFICE
CERTIFICATE OF CORRECTION

PATENT NO. : 5,080,269

DATED : January 14, 1992

INVENTOR(S) : Göran Larsson and Ake Bergqvist

It is certified that error appears in the above-identified patent and that said Letters Patent is hereby corrected as shown below:

Column 5, line 29, delete "7" and insert therefor --1--.
Column 6, line 16, delete "7" and insert therefor --1--.
Column 6, line 32, delete "7" and insert therefor --1--.

Signed and Sealed this

Sixth Day of April, 1993

Attest:

STEPHEN G. KUNIN

Attesting Officer     Acting Commissioner of Patents and Trademarks